United States Patent
Valliappan et al.

(10) Patent No.: US 9,788,361 B2
(45) Date of Patent: Oct. 10, 2017

(54) SETTING TRANSMISSION PARAMETERS IN A SHARED COMMUNICATION MEDIUM

(71) Applicant: QUALCOMM Incorporated, San Diego, CA (US)

(72) Inventors: Nachiappan Valliappan, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 14/859,124

(22) Filed: Sep. 18, 2015

(65) Prior Publication Data

US 2017/0086251 A1 Mar. 23, 2017

(51) Int. Cl.
| | |
|---|---|
| H04W 76/04 | (2009.01) |
| H04L 12/26 | (2006.01) |
| H04W 72/04 | (2009.01) |
| H04W 72/08 | (2009.01) |
| H04W 52/02 | (2009.01) |
| H04W 84/12 | (2009.01) |
| H04W 24/02 | (2009.01) |
| H04W 48/16 | (2009.01) |

(52) U.S. Cl.
CPC ......... *H04W 76/048* (2013.01); *H04L 43/106* (2013.01); *H04L 43/16* (2013.01); *H04W 52/0216* (2013.01); *H04W 72/0446* (2013.01); *H04W 72/08* (2013.01); *H04W 24/02* (2013.01); *H04W 48/16* (2013.01); *H04W 84/12* (2013.01); *Y02B 60/50* (2013.01)

(58) Field of Classification Search
None
See application file for complete search history.

(56) References Cited

U.S. PATENT DOCUMENTS

| 8,989,101 | B1 | 3/2015 | Mishra |
| 2008/0112373 | A1 | 5/2008 | Shpak |
| 2009/0141685 | A1 | 6/2009 | Berglund |
| (Continued) | | | |

OTHER PUBLICATIONS

International Search Report and Written Opinion—PCT/US2016/051720—ISA/EPO—Nov. 17, 2016.

*Primary Examiner* — Brian Roberts
(74) *Attorney, Agent, or Firm* — Muncy, Geissler, Olds & Lowe, P.C.

(57) ABSTRACT

Techniques for setting transmission parameters in a shared communication medium are disclosed. A communication method in accordance with the present disclosure may include, for example, receiving in accordance with a first RAT a first management frame indicating a first BSSID and a second management frame indicating a second BSSID different from the first BSSID, calculating a timestamp difference between a first management frame timestamp included in the first management frame and a second management frame timestamp included in the second management frame, the first BSSID and the second BSSID to a first grouping associated with a first physical access point based on the timestamp difference, and selecting one or more operating channels or setting one or more parameters of a DTX communication pattern based on the assigning, the DTX communication pattern defining activated periods and deactivated periods of communication.

30 Claims, 13 Drawing Sheets

(56) References Cited

U.S. PATENT DOCUMENTS

| | | | |
|---|---|---|---|
| 2013/0078940 A1* | 3/2013 | Patil | H04W 76/007 455/404.1 |
| 2013/0088983 A1* | 4/2013 | Pragada | H04W 16/14 370/252 |
| 2013/0137423 A1* | 5/2013 | Das | H04W 12/08 455/426.1 |
| 2013/0159458 A1 | 6/2013 | Yu et al. | |
| 2013/0201884 A1 | 8/2013 | Freda et al. | |
| 2013/0208587 A1 | 8/2013 | Bala et al. | |
| 2013/0317892 A1 | 11/2013 | Heerboth | |
| 2013/0322279 A1 | 12/2013 | Chincholi et al. | |
| 2013/0336227 A1* | 12/2013 | Cho | H04W 48/16 370/328 |
| 2014/0064257 A1 | 3/2014 | Fontaine et al. | |

* cited by examiner

SETTING TRANSMISSION PARAMETERS IN A SHARED COMMUNICATION MEDIUM

INTRODUCTION

Aspects of this disclosure relate generally to telecommunications, and more particularly to setting transmission parameters in a shared communication medium.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operations is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for setting transmission parameters in a shared communication medium are disclosed.

In one example, a communication method is disclosed. The communication method may include, for example, receiving in accordance with a first Radio Access Technology (RAT) a first management frame indicating a first Basic Service Set Identifier (BSSID) and a second management frame indicating a second BSSID different from the first BSSID, calculating a timestamp difference between a first management frame timestamp included in the first management frame and a second management frame timestamp included in the second management frame, assigning the first BSSID and the second BSSID to a first grouping associated with a first physical access point based on the timestamp difference, selecting one or more operating channels or setting one or more parameters of a Discontinuous Transmission (DTX) communication pattern based on the assigning, the DTX communication pattern defining activated periods and deactivated periods of communication, and transmitting in accordance with the DTX communication pattern in accordance with a second RAT.

In another example, a communication apparatus is disclosed. The communication apparatus may include, for example, one or more transceivers, at least one processor, and at least one memory coupled to the at least one processor and configured to store data, instructions, or a combination thereof. The one or more transceivers may be configured to receive in accordance with a first Radio Access Technology (RAT) a first management frame indicating a first Basic Service Set Identifier (BSSID) and a second management frame indicating a second BSSID different from the first BSSID, and transmit on one or more operating channels in accordance with a second RAT and transmit in accordance with a Discontinuous Transmission (DTX) communication pattern. The at least one processor may be configured to calculate a timestamp difference between a first management frame timestamp included in the first management frame and a second management frame timestamp included in the second management frame, assign the first BSSID and the second BSSID to a first grouping associated with a first physical access point based on the timestamp difference, and select the one or more operating channels or set one or more parameters of the DTX communication pattern based on the assigning, the DTX communication pattern defining activated periods and deactivated periods of communication.

In another example, another communication method is disclosed. The communication method may include, for example, receiving in accordance with a first Radio Access Technology (RAT) a first management frame indicating a first Basic Service Set Identifier (BSSID) and a second management frame indicating a second BSSID different from the first BSSID, comparing a first fixed field of the first management frame and a second fixed field of the second management frame, determining a correspondence between the first fixed field and the second fixed field, assigning the first BSSID and the second BSSID to a first grouping associated with a first physical access point in response to the determining, selecting one or more operating channels or setting one or more parameters of a Discontinuous Transmission (DTX) communication pattern based on the assigning, the DTX communication pattern defining activated periods and deactivated periods of communication, and transmitting on the selected operating channel in accordance with a second RAT or transmitting in accordance with the DTX communication pattern.

In another example, another communication method is disclosed. The communication method may include, for example, receiving in accordance with a first Radio Access Technology (RAT) a first series of management frames indicating a first Basic Service Set Identifier (BSSID) and a second series of management frames indicating a second BSSID different from the first BSSID determining a first series of received signal strength indications (RSSI) corresponding to the first management frames and a second series of RSSI corresponding to the second management frames determining that a correlation between the first series of RSSI and the second series of RSSI exceeds a correlation threshold, assigning the first BSSID and the second BSSID to a first grouping associated with a first physical access point in response to the determining, selecting one or more operating channels or setting one or more timing parameters of a Discontinuous Transmission (DTX) communication pattern based on the assigning, the DTX communication pattern defining activated periods and deactivated periods of communication, and transmitting in accordance with the DTX communication pattern in accordance with a second RAT.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
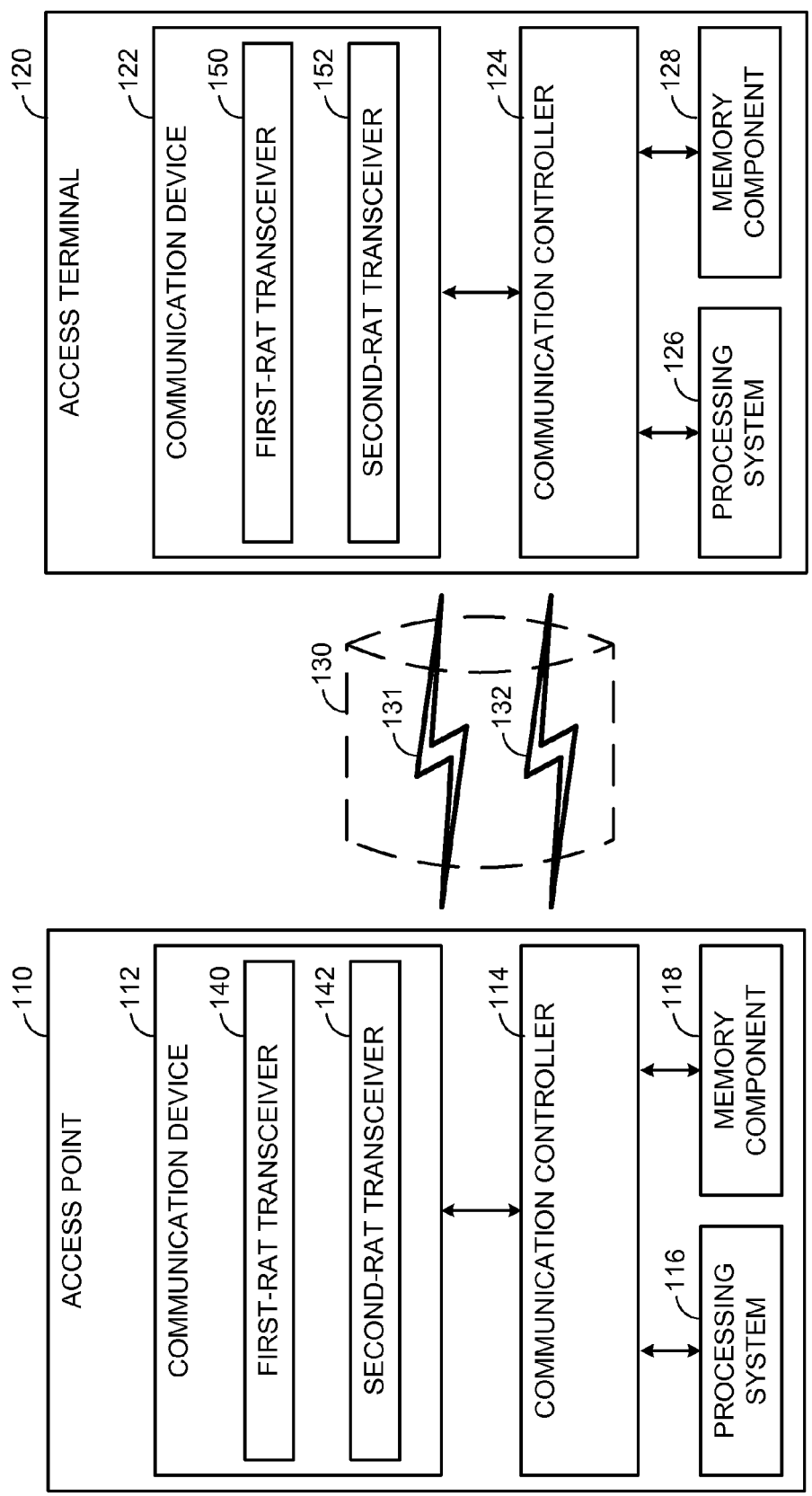
FIG. 1 illustrates an example wireless communication system including an access point in communication with an access terminal.

The present disclosure relates generally to telecommunications, and more particularly to setting transmission parameters in a shared communication medium.

In a communication medium that is shared by multiple access points, the access points may be configured to coexist with one another. In order to facilitate coexistence, an access point may set its transmission parameters based on a total number of physical access points that are sharing the communication medium. As used herein, the term "physical access point" may refer to one of various arrangements. For example, a "physical access point" may refer to an access point having components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The physical access points may be single-BSS access points or multi-BSS access points. A "single-BSS access point" is a physical access point that is only capable of establishing a single Basic Service Set (BSS), whereas a "multi-BSS access point" is a physical access point that is capable of establishing multiple BSSs.

In a scenario where each physical access point in the wireless environment is a single-BSS access point, it is relatively easy to tabulate the total number of physical access points that are sharing the communication medium. For example, by receiving management frames from the other physical access points via the shared communication medium and reading a unique Basic Service Set Identifier (BSSID) included in each management frame, every BSS (and therefore, every physical access point) can be identified. However, the process for determining the number of physical access points becomes more complicated if the wireless environment includes multi-BSS access points. Therefore, solutions are needed for determining a total number of physical access points.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates a wireless communication system including an access point in communication with an access terminal Unless otherwise noted, the terms "access terminal" and "access point" are not intended to be specific or limited to any particular Radio Access Technology (RAT). In general, access terminals may be any wireless communication device allowing a user to communicate over a communication network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, WLAN access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may exchange messages with the access point 110 via first channel 131 and/or second channel 132, the message including information related to various types of communication (e.g., voice, data, multimedia services, associated control signaling, etc.). The channels 131 and 132 may operate over a communication medium of interest, shown by way of example in FIG. 1 as the communication medium 130, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 130.

As a particular example, the communication medium 130 may correspond to at least a portion of an unlicensed frequency band shared with other RATs. In general, the access point 110 and the access terminal 120 may operate via the channels 131 and 132 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a first-RAT transceiver 140 configured to operate in accordance with one RAT and a second-RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a WLAN chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The first-RAT transceiver 140 and the second-RAT transceiver 142 may provide different functionalities and may be used for different purposes. As an example, the first-RAT transceiver 140 may operate in accordance with Long Term Evolution (LTE) technology to provide communication with the access terminal 120 on the channels 131 and 132, while the second-RAT transceiver 142 may operate in accordance with WLAN technology to monitor WLAN signaling on the communication medium 130 that may interfere with or be interfered with by the LTE communications. The second-RAT transceiver 142 may or may not serve as a full WLAN access point providing communication services to at least one BSS. The communication device 122 of the access terminal 120 may, in some designs, include similar first-RAT transceiver and/or second-RAT transceiver functionality, as shown in FIG. 1 by way of a first-RAT transceiver 150 and a second-RAT transceiver 152, although such dual-transceiver functionality may not be required.

Figure 2:
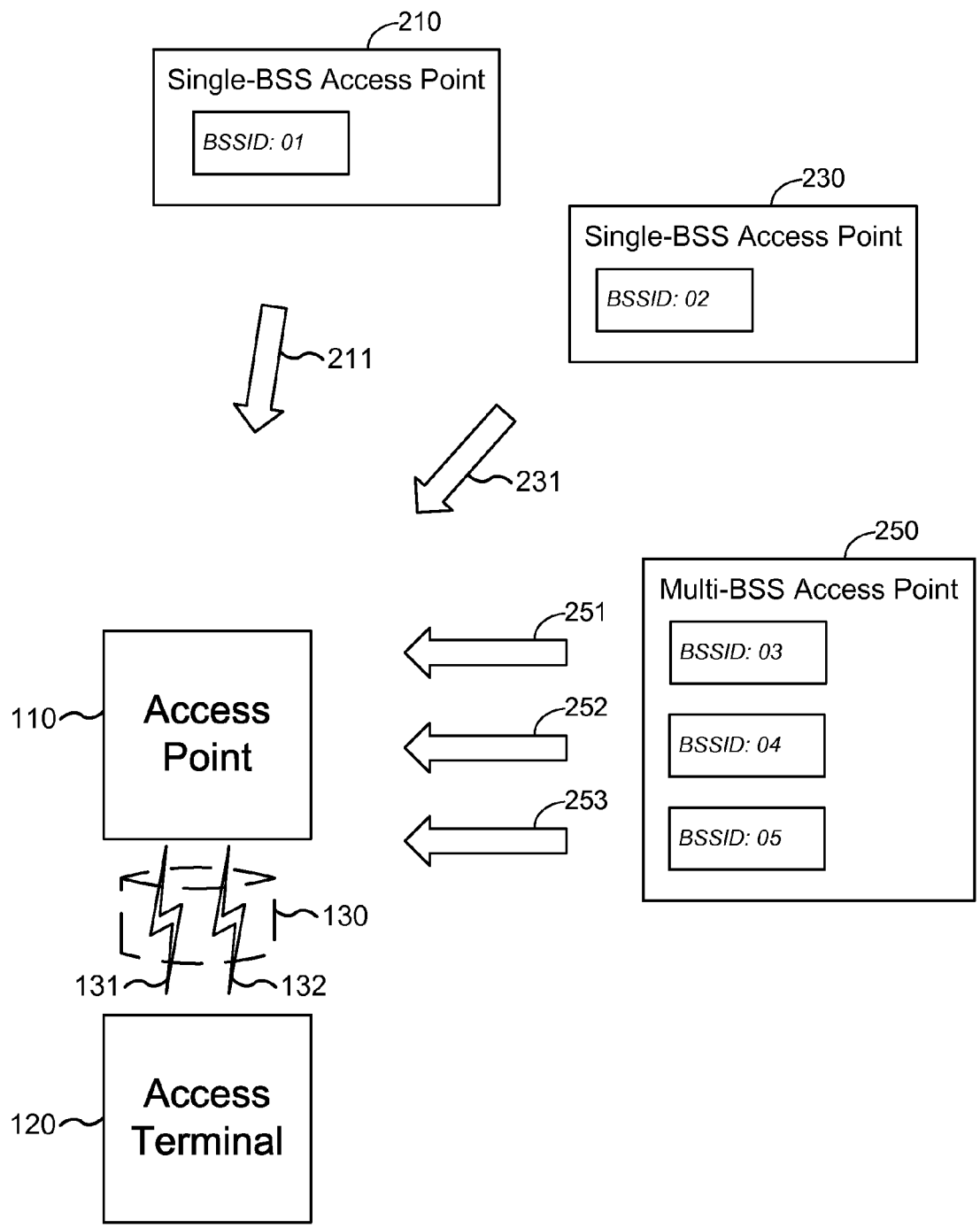
FIG. 2 illustrates an example of a wireless environment in which the access point and the access terminal of FIG. 1 may operate in accordance with an aspect of the disclosure.

FIG. 2 illustrates an example of a wireless environment in which the access point 110 and the access terminal 120 of FIG. 1 may operate in accordance with an aspect of the disclosure. As shown, the access point 110 and the access terminal 120 share the wireless environment with two single-BSS access points 210 and 230 and a multi-BSS access point 250.

The single-BSS access point 210 depicted in FIG. 2 may establish a single BSS. Generally, a BSS is identified using a basic service set identifier (BSSID), which is a unique number or code by which the BSS can be identified. As depicted in FIG. 2, the single-BSS access point 210 is a physical access point that has established a single BSS with a BSSID of "01". Similarly, the single-BSS access point 230 is a physical access point that has established a single BSS with a BSSID of "02".

Generally, access points may identify themselves to nearby wireless devices (e.g., access terminals, access points, etc.) by transmitting a management frame. The management frame may be, for example, a beacon frame, a probe response frame, an association response frame, or a reassociation response frame. In an example, the management frame may be broadcast intermittently (e.g., periodically). Each management frame may include the BSSID of the access point that transmitted the management frame. The BSSID may be written in a BSSID data field that is specifically designated for BSSID data.

For example, in the wireless environment of FIG. 2, the single-BSS access point 210 may transmit a management frame 211. The management frame 211 includes the BSSID that identifies the single-BSS access point 210 ("01", as noted above). Later (for example, after a delay 100 ms), the single-BSS access point 210 may repeat the transmission of the management frame 211. The repeated transmission of the management frame 211 will include the same BSSID ("01") as the initial transmission. If the access point 110 receives both the initial transmission of the management frame 211 and the repeated transmission of the management frame 211, the access point 110 may determine that both transmissions were sent from the same physical access point.

Similar to the single-BSS access point 210, the single-BSS access point 230 may transmit a management frame 231. The management frame 231 includes the BSSID that identifies the single-BSS access point 230 ("02", as noted above). By contrast to the single-BSS access points 210 and 230, the multi-BSS access point 250 depicted in FIG. 2 has established three BSSs with respective BSSIDs "03", "04" and "05". Accordingly, the management frames 251, 252, and 253 transmitted by the multi-BSS access point 250 may include any one of three unique BSSIDs. In particular, the management frame 251 includes the BSSID "03", the management frame 252 includes the BSSID "04", and the management frame 253 includes the BSSID "05".

Although the multi-BSS access point 250 depicted in FIG. 2 has established three BSSs, it will be understood that the multi-BSS access point 250 is capable of establishing fewer than three BSSs (for example, one or two BSSs) or more than three BSSs (for example, four or more BSSs). The distinct BSSs established by a multi-BSS access point (e.g., multi-BSS access point 250) may sometimes be referred to as "virtual access points". Using this terminology, a multi-BSS access point (like the multi-BSS access point 250) constitutes a single "physical access point", but may comprise multiple "virtual access points".

The access point 110 may receive each of the management frames 211, 231, 251, 252, and 253. Because the management frames 211, 231, 251, 252, and 253 each include a different BSSID ("01", "02", "03", "04", and "05", respectively), the access point 110 can conclude that each of the management frames 211, 231, 251, 252, and 253 is associated with a different BSS. However, as can be understood from FIG. 2, the access point 110 can not assume that each BSS is associated with a different physical access point. As is the case in FIG. 2, three of the BSSs have in fact been established by the multi-BSS access point 250.

As noted above, an access point such as access point 110 may set its transmission parameters based on the total number of physical access points that are sharing the communication medium. However, it will be appreciated from FIG. 2 that the access point 110 can not simply assume that each BSS that it detects is associated with a distinct physical access point. In the event that the wireless environment includes a multi-BSS access point (such as the multi-BSS access point 250), the total number of physical access points may be different from the total number of BSSs.

Figure 3:
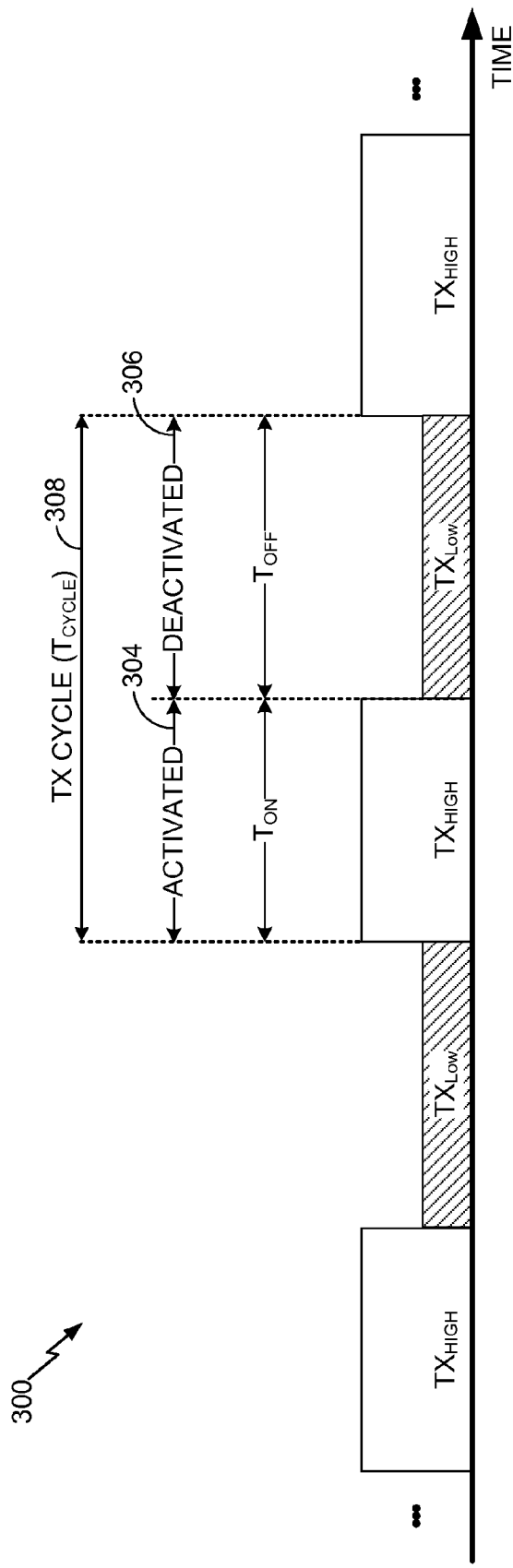
FIG. 3 illustrates certain aspects of an example long-term Discontinuous Transmission (DTX) communication scheme.

FIG. 3 illustrates certain aspects of an example long-term discontinuous transmission (DTX) communication scheme that may be implemented on the communication medium 130. The access point 110 may utilize the DTX communication scheme to foster coexistence between (i) first-RAT communications between the access point 110 and the access terminal 120 and (ii) other, second-RAT communications between neighboring devices. For example, the access point 110 may foster coexistence by switching operation of the first RAT over the communication medium 130 between activated periods 304 of communication and deactivated periods 306 of communication. During a period of time $T_{ON}$ associated with each activated period 304, first-RAT transmission on the communication medium 130 may proceed at a normal, relatively high transmission power ($TX_{HIGH}$). During a period of time $T_{OFF}$ associated with each deactivated period 306, however, first-RAT transmission on the communication medium 130 is disabled or at least sufficiently reduced to a low transmission power ($TX_{LOW}$) in order to yield the communication medium 130 to neighboring devices operating according to the second RAT. During this time, various network listening functions and associated measurements may be performed via the communication controller 114, as desired, such as medium utilization measurements, medium utilization sensing, and so on. A given activated period 304/deactivated period 306 pair may constitute a DTX cycle 308 having a length $T_{CYCLE}$ equal to the sum of $T_{ON}$ and $T_{OFF}$. One or more DTX cycles 308 may collectively form a DTX communication pattern 300.

In some DTX communication schemes, the switching between activated periods 304 and deactivated periods 306 may be largely predefined (e.g., periodic) and referred to as a Time Division Multiplexing (TDM) communication scheme. A TDM communication scheme may be characterized by a corresponding TDM communication pattern defining the location (timing) of the activated periods 304 and deactivated periods 306 via a set of one or more TDM parameters. Each of the associated TDM parameters, including, for example, a duty cycle (i.e., $T_{ON}/T_{CYCLE}$) and the respective transmission powers during activated periods 304 and deactivated periods 306, may be adapted based on the current signaling conditions on the communication medium 130 to dynamically optimize the TDM communication scheme. For example, the second-RAT transceiver 142 configured to operate in accordance with the second RAT (e.g., WLAN) may be further configured to monitor the communication medium 130 during the time period $T_{OFF}$ for second-RAT signaling, which may interfere with or be interfered with by first-RAT communications over the communication medium 130. The communication controller 114 may be configured to determine a utilization metric associated with utilization of the communication medium 130 by the second-RAT signaling. Based on the utilization metric, the associated parameters may be set and the first-RAT transceiver 140 configured to operate in accordance with the first RAT (e.g., LTE) may be further configured to cycle between activated periods 304 of communication and deactivated periods 306 of communication over the communication medium 130 in accordance therewith. As an example, if the utilization metric is high (e.g., above a threshold), one or more of the parameters may be adjusted such that usage of the communication medium 130 by the first-RAT transceiver 140 is reduced (e.g., via a decrease in the duty cycle or transmission power). Conversely, if the utilization metric is low (e.g., below a threshold), one or more of the parameters may be adjusted such that usage of the communication medium 130 by the first-RAT transceiver 140 is increased (e.g., via an increase in the duty cycle or transmission power).

Figure 4:
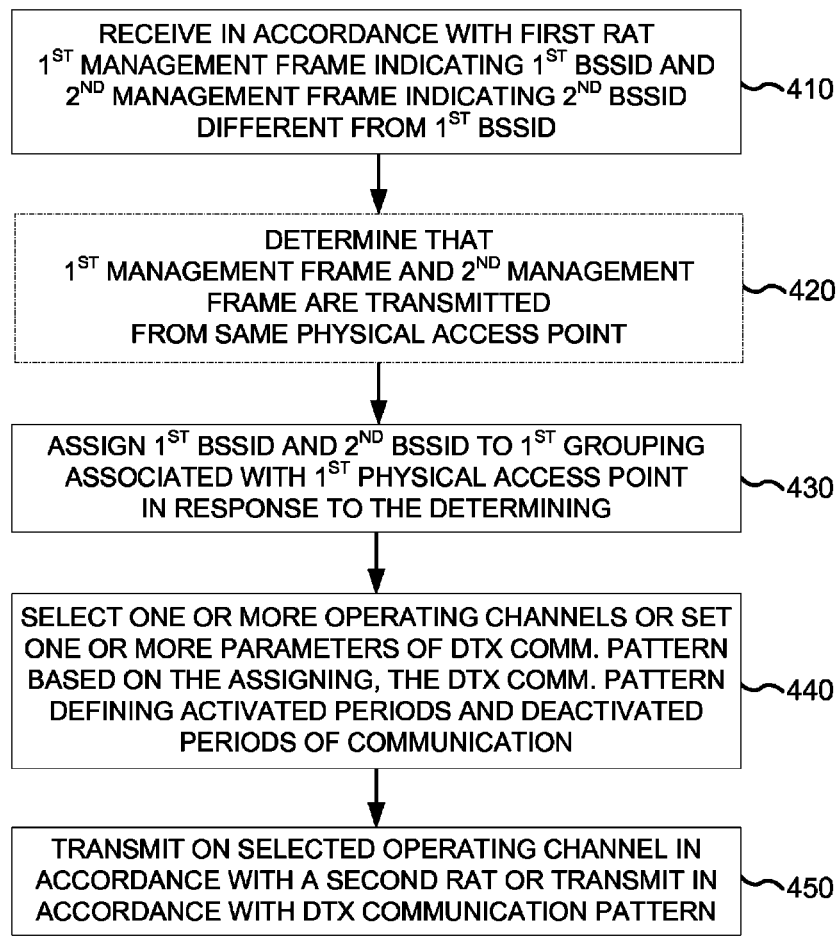
FIG. 4 illustrates a communication method in accordance with an aspect of the disclosure.

FIG. 4 illustrates a communication method in accordance with an aspect of the disclosure. The communication method may be performed by, for example, one or more components analogous to the first-RAT transceiver 140, the second-RAT transceiver 142, the communication controller 114, the processing system 116, and/or the memory component 118 of the access point 110. For the purposes of illustration, the communication method will be described below as it would be performed by the access point 110, however it will be appreciated that other devices and/or a combination of devices may perform the methods described herein.

At 410, the access point 110 receives, in accordance with a first RAT, a first management frame indicating a first BSSID and a second management frame indicating a second BSSID that is different from the first BSSID. For example, the first RAT may be a WLAN RAT. Moreover, the first management frame and the second management frame may be beacon signals or probe response signals that are intermittently transmitted from a WLAN physical access point. The receiving at 410 may be performed by, for example, one or more components analogous to the first-RAT transceiver 140.

At 420, the access point 110 determines that the first management frame and the second management frame are transmitted from the same physical access point. For example, after receiving both the first management frame and the second management frame (at 410), the access point 110 may determine that both management frames were sent from the same physical access point, despite the fact that (as noted above) the second BSSID indicated by the second management frame is different from the first BSSID indicated by the first management frame. The determining at 420 may be performed by, for example, one or more components analogous to the first-RAT transceiver 140, the second-RAT transceiver 142, the communication controller 114, the processing system 116, and/or the memory component 118. The determining at 420 will be described in greater detail below, with reference to FIGS. 5-9. In accordance with various aspects of the disclosure, the determining at 420 may be performed in accordance with any one of the methods of FIGS. 5-9, any other method set forth in the present disclosure, or any combination thereof.

At 430, the access point 110 assigns the first BSSID and the second BSSID to a first grouping associated with a first physical access point in response to the determining at 420. The assigning at 430 may be performed by, for example, one or more components analogous to the communication controller 114, the processing system 116, and/or the memory component 118. For example, after receiving the first management frame and the second management frame at 410, the access point 110 may record the first BSSID and the second BSSID within the one or more components analogous to the memory component 118. After the access point 110 determines at 420 that the first management frame and the second management frame were transmitted from the same physical access point, the access point 110 may assign the first BSSID and the second BSSID to the first grouping associated with the first physical access point, and may record the assignment within the one or more components analogous to the memory component 118.

At 440, the access point 110 selects an operating channel (e.g., first channel 131) and sets one or more parameters of the DTX communication pattern 300 based on the assigning at 430. The selecting or setting at 440 may be performed by, for example, one or more components analogous to the communication controller 114, the processing system 116, and/or the memory component 118.

The access point 110 may select the operating channel by determining a total number of physical access points associated with each channel of a plurality of available channels and selecting the channel associated with the smallest number of physical access points. For example, the first channel 131 may be associated with five distinct BSSIDs that are established by three distinct physical access points (as in the scenario depicted in FIG. 2). The second channel 132 may be associated with four distinct BSSIDs that are established by four different physical access points. Rather than selecting the second channel 132 based on a determination that the second channel 132 is associated with fewer distinct BSSIDs than the first channel 131 (four as compared to five), the access point 110 may select the first channel 131 based on a determination that the first channel 131 is associated with fewer physical access points than the second channel 132 (three as compared to four).

As noted above with respect to FIG. 3, the DTX communication pattern 300 defines the activated periods 304 and the deactivated periods 306 of communication. The access point 110 may set the one or more parameters by selecting a default parameter value for one or more of the parameters. Additionally or alternatively, the access point 110 may set the one or more parameters by adjusting (e.g., increasing or decreasing) the parameter value for one or more of the parameters. The parameter value may be adjusted relative to the default value or to a previous parameter value (e.g., by incrementing or decrementing the parameter value by a predetermined amount).

For example, the access point 110 may set (at 440) the one or more parameters of the DTX communication pattern 300 based on the number of physical access points with which it is sharing the communication medium 130. In a first scenario, the access point 110 may elect to utilize a relatively great share of the communication medium 130 after determining that there are relatively few physical access points in the surrounding wireless environment. Accordingly, the access point 110 may set the one or more parameters of the DTX communication pattern 300 by increasing, for example, one or more of the duty cycle ($T_{ON}/T_{CYCLE}$) and/or transmission power ($TX_{HIGH}$) associated with the DTX communication pattern 300. In a second scenario, the access point 110 may elect to utilize a relatively small share of the communication medium 130 after determining that there are relatively many physical access points in the surrounding wireless environment. Accordingly, the access point 110 may set the one or more parameters of the DTX communication pattern 300 by decreasing, for example, one or more of the duty cycle ($T_{ON}/T_{CYCLE}$) and/or transmission power ($TX_{HIGH}$) associated with the DTX communication pattern 300.

The number of physical access points may be compared to, for example, a previously tabulated number of physical access points. For example, the access point 110 may determine that previously there were five physical access points sharing the communication medium 130 and that presently there are four. The access point 110 would accordingly determine that there are relatively few physical access points sharing the communication medium 130. Additionally or alternatively, the number of physical access points may be compared to a threshold number of physical access points. For example, the access point 110 may determine that there are four physical access points sharing the communication medium 130 and that the threshold number of physical access points is three. The access point 110 would accordingly determine that there are relatively many physical access points sharing the communication medium 130.

At 450, the access point 110 transmits on the selected operating channel (e.g., first channel 131 and/or second channel 132) in accordance with the DTX communication pattern 300 and in accordance with a second RAT. The DTX communication pattern 300 may be the DTX communication pattern that was set at 440. The second RAT may be, for example, LTE. The transmitting at 450 may be performed by, for example, one or more components analogous to the first-RAT transceiver 140, and/or the second-RAT transceiver 142.

As noted above, the access point 110 determines at 420 that the first management frame and the second management frame are transmitted from the same physical access point. It will be understood that in some scenarios (not shown in FIG. 4), the access point 110 may determine that the first management frame and the second management frame are in fact transmitted from different physical access points. Accordingly, the assigning at 430 may differ as well. In particular, if the access point 110 determines that the first management frame and the second management frame were transmitted from different physical access points, then the access point 110 may not assign the first BSSID and the second BSSID to a first grouping associated with a first physical access point. Instead, the access point 110 may assign the first BSSID to a first grouping associated with a first physical access point and the second BSSID to a second grouping associated with a second physical access point.

Figure 5:
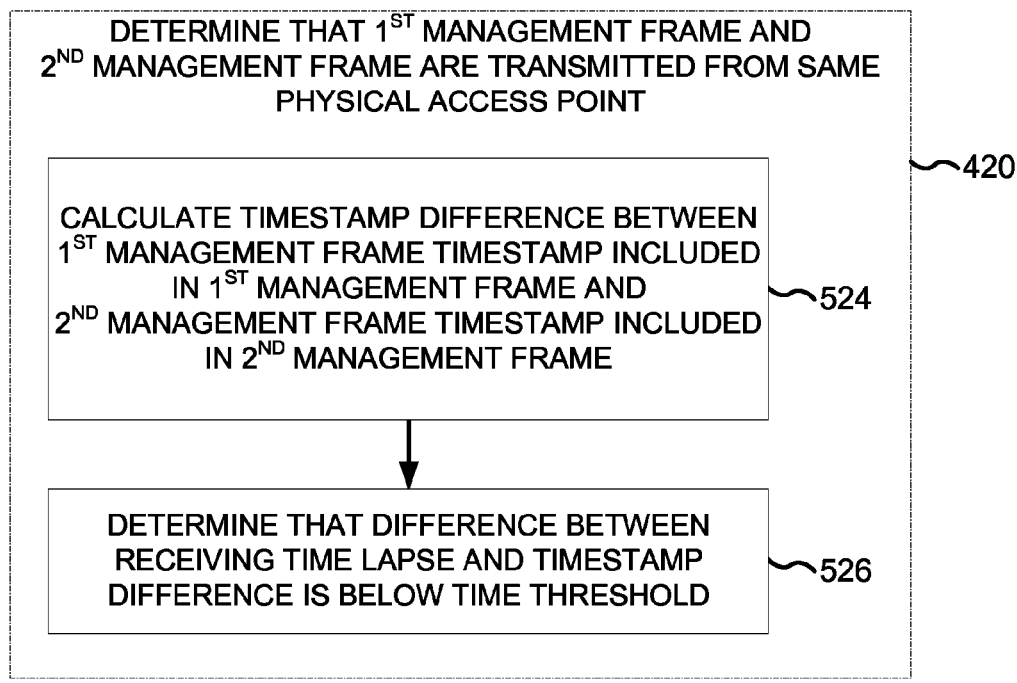
FIG. 5 illustrates, in more detail, an example implementation of certain aspects of the communication method of FIG. 4.

FIG. 5 illustrates in more detail an example implementation of certain aspects of the example communication method of FIG. 4. In this implementation, more specific operations are shown for the determining (at 420) that the first management frame and the second management frame are transmitted from the same physical access point. As noted above, the determining (at 420) may be performed by, for example, one or more components analogous to the first-RAT transceiver 140, the second-RAT transceiver 142, the communication controller 114, the processing system 116, and/or the memory component 118. For the purposes of illustration, the communication method of FIG. 5 will be described below as it would be performed by the access point 110, however, it will be appreciated that other devices may perform the methods described herein.

At 524, the access point 110 calculates a timestamp difference between a first management frame timestamp included in the first management frame and a second management frame timestamp included in the second management frame. As noted above, the management frame may be, for example, a beacon frame, a probe response frame, an association response frame, or a reassociation response frame. The management frame may include timestamp data that identifies a time at which the management frame was generated and/or transmitted. In a scenario where the management frame is a WLAN beacon frame, the WLAN beacon frame may include a specific data field that includes the timestamp data. In an example, the access point 110 may read the respective timestamp data fields of the first management frame and the second management frame. The access point 110 may optionally record the first management frame timestamp included in the first management frame and the second management frame timestamp included in the second management frame. The first management frame timestamp and the second management frame timestamp may be recorded in, for example, one or more components analogous to the memory component 118. The access point 110 may calculate a timestamp difference between the first management frame timestamp and the second management frame timestamp, and record the timestamp difference in one or more components analogous to the memory component 118.

At 526, the access point 110 determines that the timestamp difference calculated at 524 is below a time threshold. After determining at 526 that the difference is below the time threshold, the access point 110 may conclude that the first management frame and the second management frame are transmitted from the same physical access point (as shown at 420 of FIG. 4), and then proceed to the assigning at 430, the setting at 440, and the transmitting at 450.

The time threshold may be set to a small value near zero, for example, one-hundred and fifty microseconds. The timestamp for a particular management frame may be determined by a hardware counter associated with the physical access point. The hardware counter may be, for example, a sixty-four bit counter based on a one MHz clock, such that the hardware counter repeats very infrequently. As a result, it is highly unlikely that two different physical access points will be synchronized, and if two different management frames have timestamps that are in close proximity to one another, it is likely that they were transmitted from the same physical access point.

It will be understood that in some scenarios, the timestamp difference calculated at 524 may exceed the time threshold. In these scenarios, the access point 110 may determine that the first management frame and the second management frame are transmitted from different physical access points.

Figure 6:
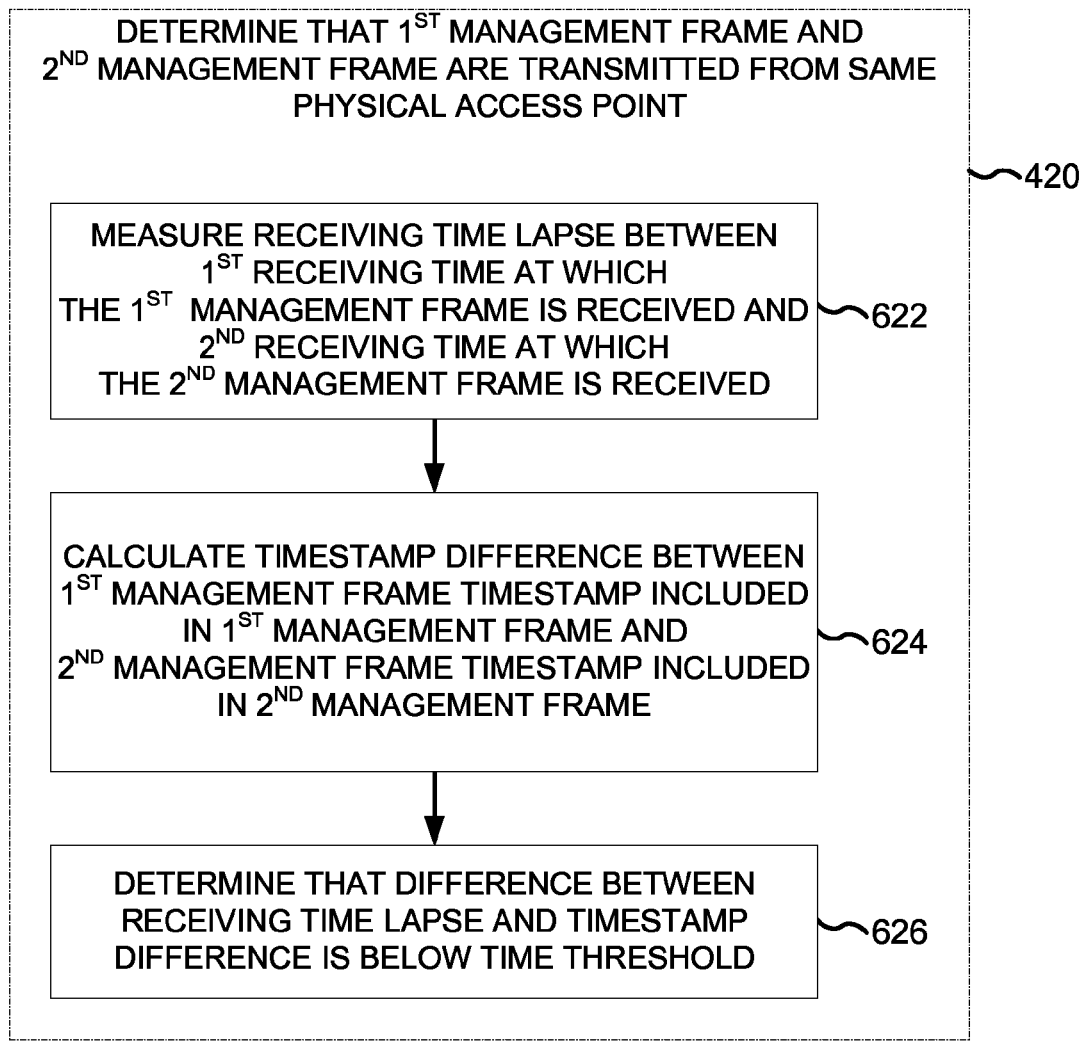
FIG. 6 illustrates, in more detail, an example implementation of certain aspects of the communication method of FIG. 4.

FIG. 6 illustrates in more detail an example implementation of certain aspects of the example communication method of FIG. 4. In this implementation, more specific operations are shown for the determining (at 420) that the first management frame and the second management frame are transmitted from the same physical access point. As noted above, the determining at 420 may be performed by, for example, one or more components analogous to the first-RAT transceiver 140, second-RAT transceiver 142, communication controller 114, processing system 116, and/or memory component 118. For the purposes of illustration, the communication method of FIG. 6 will be described below as it would be performed by the access point 110, however, it will be appreciated that other devices may perform the methods described herein.

At 622, the access point 110 measures a receiving time lapse between a first receiving time at which the first management frame is received and a second receiving time at which the second management frame is received. For example, after receiving the first management frame (at 410, as noted above), the access point 110 may record a first receiving time associated with a time at which the first management frame is received. The first receiving time may be recorded in, for example, one or more components analogous to the memory component 118. Moreover, after receiving the second management frame (at 410, as noted above), the access point 110 may record a second receiving time associated with a time at which the second management frame is received. The second receiving time may be recorded in, for example, one or more components analogous to the memory component 118. Finally, the access point 110 may measure a receiving time lapse between the first receiving time and the second receiving time, and record the receiving time lapse in one or more components analogous to the memory component 118.

At 624, the access point 110 calculates a timestamp difference between a first management frame timestamp included in the first management frame and a second management frame timestamp included in the second management frame. As noted above, the management frame may be, for example, a beacon frame or a probe response frame. The management frame may include timestamp data that identifies a time at which the management frame was generated and/or transmitted. In a scenario where the management frame is a WLAN beacon frame, the WLAN beacon frame may include a specific data field that includes the timestamp data. In an example, the access point 110 may read the respective timestamp data fields of the first management frame and second management frame. The access point 110 may optionally record the first management frame timestamp included in the first management frame and the second management frame timestamp included in the second management frame. The first management frame timestamp and second management frame timestamp may be recorded in, for example, one or more components analogous to the memory component 118. The access point 110 may calculate a timestamp difference between the first management frame timestamp and the second management frame timestamp, and record the timestamp difference in one or more components analogous to the memory component 118.

At 626, the access point 110 determines that the difference between the receiving time lapse measured at 622 and the timestamp difference calculated at 624 is below a time threshold. After determining at 626 that the difference is below the time threshold, the access point 110 may conclude that the first management frame and the second management frame are transmitted from the same physical access point (as shown at 420 of FIG. 4), and then proceed to the assigning at 430, the setting at 440, and the transmitting at 450.

The difference may be an absolute magnitude. Moreover, the time threshold may be set to a small value near zero, such that any difference that is below the time threshold may be either equal to zero, or so small that that it can be attributed to expected variations in precision and/or accuracy when performing the measuring at 622, calculating at 624, etc. By contrast, a difference that is above the time threshold may be significantly non-zero, such that the value is not solely attributable to expected variations in precision and/or accuracy when performing the measuring at 622, calculating at 624, etc.

It will be understood that in some scenarios, the difference between the receiving time lapse measured at 622 and the timestamp difference calculated at 624 may exceed the time threshold. In these scenarios, the access point 110 may determine that the first management frame and the second management frame are transmitted from different physical access points.

Figure 7:
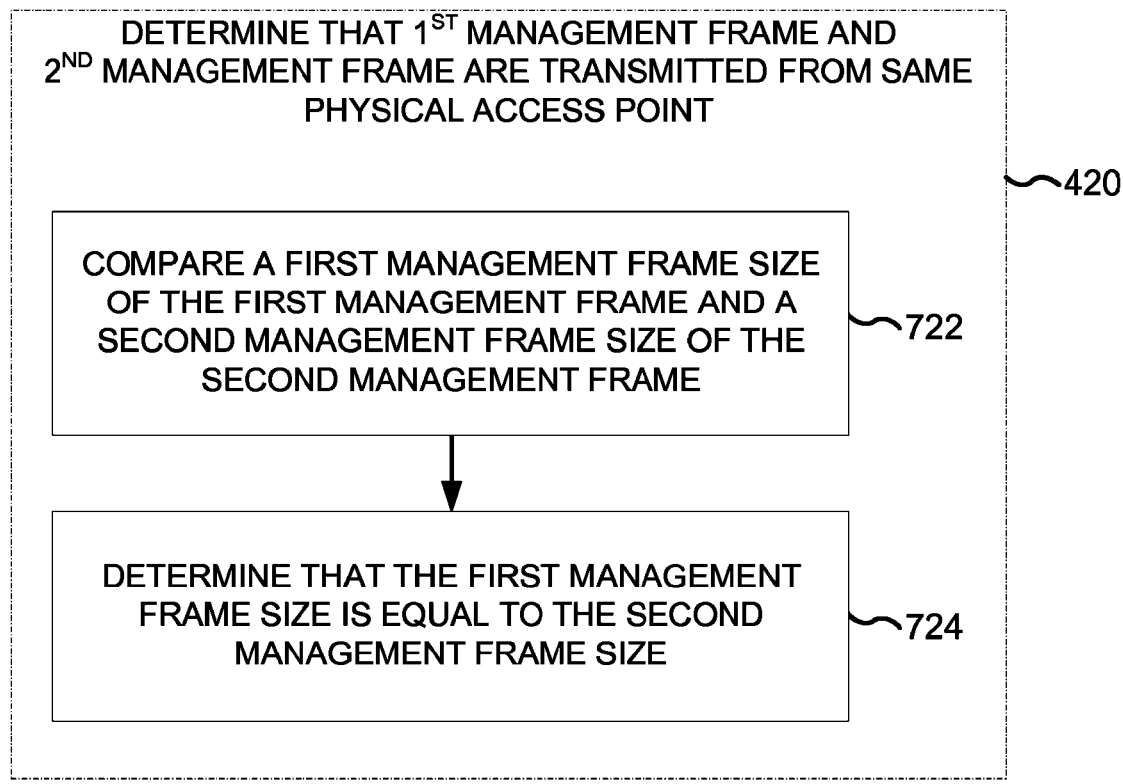
FIG. 7 illustrates, in more detail, an example implementation of certain aspects of the communication method of FIG. 4.
Figure 8:
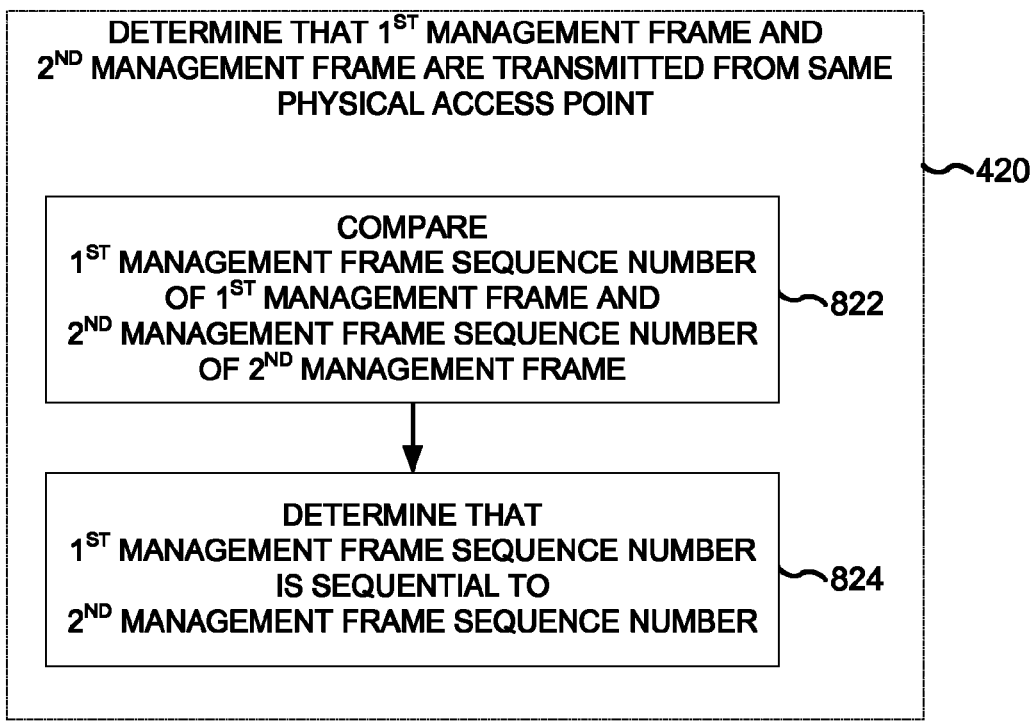
FIG. 8 illustrates, in more detail, an example implementation of certain aspects of the communication method of FIG. 4.

FIGS. 7-8 illustrate in more detail example implementations of certain aspects of the example communication method of FIG. 4. In these example implementations, the access point 110 performs an inspection of the received management frames in which respective fixed fields from each of the first management frame and the second management frame are compared. A fixed field may be included in each management frame transmitted by a physical access point. Although a multi-BSS access point may transmit management frames having different data in a BSSID data field, the management frames may have data in other fixed fields and/or information elements (IEs) that can be used to determine that the management frames were transmitted by a common physical access point. The fixed fields and/or the data or data type included therein may be fixed by, for example, government regulations, technical standards, manufacturer-specific parameters, or any combination thereof. Although FIGS. 7-8 illustrate two specific implementations, it will be understood that any fixed field may be the subject of a fixed field inspection.

FIG. 7 illustrates in more detail an example implementation of certain aspects of the example communication method of FIG. 4. In this implementation, more specific operations are shown for the determining at 420. As noted above, the determining at 420 may be performed by, for example, one or more components analogous to the first-RAT transceiver 140, the second-RAT transceiver 142, the communication controller 114, the processing system 116, and/or the memory component 118. For the purposes of illustration, the communication method of FIG. 7 will be described below as it would be performed by the access point 110, however, it will be appreciated that other devices may perform the methods described herein.

At 722, the access point 110 compares a first fixed field of the first management frame to a second fixed field of the second management frame. In particular, the access point 110 compares a first management frame size of the first management frame and a second management frame size of the second management frame. As noted above, the management frame may be, for example, a beacon frame, a probe response frame, an association response frame, or a reassociation response frame. The access point 110 may directly measure the size of the management frame. Additionally or alternatively, the management frame may include management frame size data that identifies a size of the management frame. In a scenario where the management frame is a WLAN beacon frame, the WLAN beacon frame may include a specific data field that includes the management frame size data. In an example, the access point 110 may read the respective management frame size data fields of the first management frame and the second management frame. The access point 110 may optionally record the first management frame size included in the first management frame and the second management frame size included in the second management frame. The first management frame timestamp and the second management frame timestamp may be recorded in, for example, one or more components analogous to the memory component 118. The access point 110 may compare the first management frame size to the second management frame size.

At 724, the access point 110 determines that the first management frame size is equal to the second management frame size. After determining at 724 that the first management frame size is equal to the second management frame size, the access point 110 may conclude that the first management frame and the second management frame are transmitted from the same physical access point (as shown at 420 of FIG. 4), and then proceed to the assigning at 430, the setting at 440, and the transmitting at 450.

It will be understood that in some scenarios, the first management frame size may not be equal to the second management frame size. In these scenarios, the access point 110 may determine that the first management frame and the second management frame are transmitted from different physical access points.

FIG. 8 illustrates in more detail an example implementation of certain aspects of the example communication method of FIG. 4. In this implementation, more specific operations are shown for the determining at 420. As noted above, the determining (at 420) may be performed by, for example, one or more components analogous to the first-RAT transceiver 140, the second-RAT transceiver 142, the communication controller 114, the processing system 116, and/or the memory component 118. For the purposes of illustration, the communication method of FIG. 8 will be described below as it would be performed by the access point 110, however, it will be appreciated that other devices may perform the methods described herein.

At 822, the access point 110 compares a first fixed field of the first management frame to a second fixed field of the second management frame. In particular, the access point 110 compares a first management frame sequence number of the first management frame and a second management frame sequence number of the second management frame. As noted above, the management frame may be, for example, a beacon frame, a probe response frame, an association response frame, or a reassociation response frame. Each management frame may include management frame sequence number data that identifies a sequence number of the management frame. In a scenario where the management frame is a WLAN beacon frame, the WLAN beacon frame may include a specific data field that includes the management frame sequence number data. In an example, the access point 110 may read the respective management frame sequence number data fields of the first management frame and the second management frame. The access point 110 may optionally record the first management frame sequence number included in the first management frame and the second management frame sequence number included in the second management frame. The first management frame timestamp and second management frame timestamp may be recorded in, for example, one or more components analogous to the memory component 118. The access point 110 may compare the first management frame sequence number to the second management frame sequence number.

At 824, the access point 110 determines that the first management frame sequence number is sequential to the second management frame sequence number. After determining at 824 that the first management frame sequence number is sequential to the second management frame sequence number, the access point 110 may conclude that the first management frame and the second management frame are transmitted from the same physical access point (as shown at 420 of FIG. 4), and then proceed to the assigning at 430, the setting at 440, and the transmitting at 450.

It will be understood that in some scenarios, the first management frame sequence number may not be sequential to the second management frame sequence number. In these scenarios, the access point 110 may determine that the first management frame and the second management frame are transmitted from different physical access points.

Figure 9:
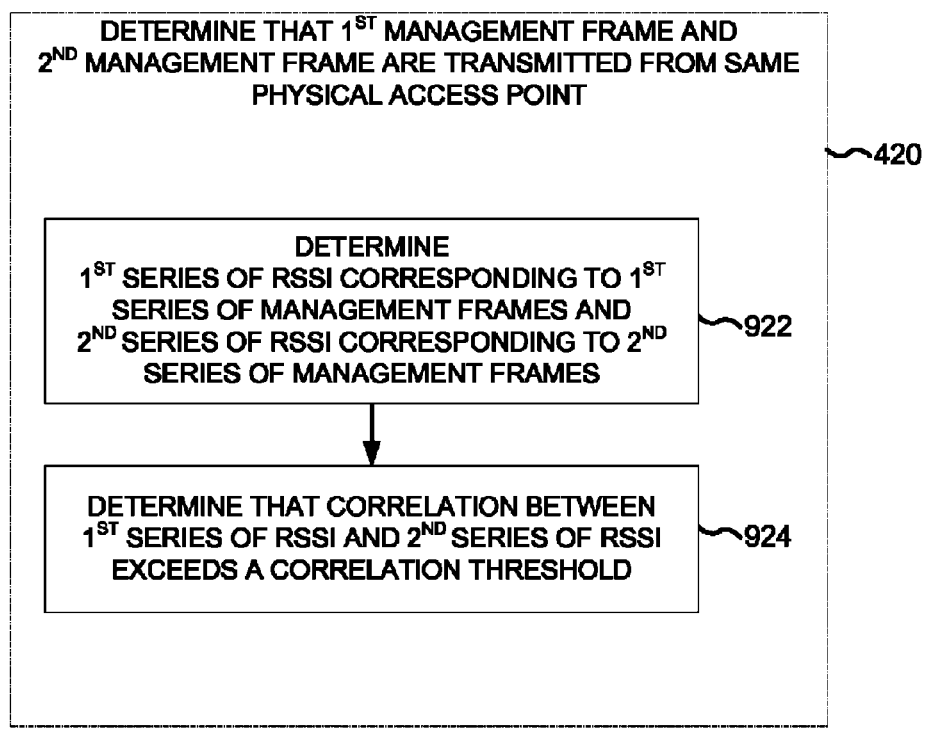
FIG. 9 illustrates, in more detail, an example implementation of certain aspects of the communication method of FIG. 4.

FIG. 9 illustrates in more detail an example implementation of certain aspects of the example communication method of FIG. 4. In this implementation, more specific operations are shown for the determining at 420. As noted above, the determining (at 420) may be performed by, for example, one or more components analogous to the first-RAT transceiver 140, the second-RAT transceiver 142, the communication controller 114, the processing system 116, and/or the memory component 118. For the purposes of illustration, the communication method of FIG. 9 will be described below as it would be performed by the access point 110, however, it will be appreciated that other devices may perform the methods described herein.

At 922, the access point 110 determines a first series of received signal strength indications (RSSI) corresponding to a first series of management frames and a second series of RSSI corresponding to a second series of management frames. For example, the first series may include the first management frame having the first BSSID and the second series may include the second management frames having the second BSSID different from the first BSSID. Moreover, each management frame in the first series may include the first BSSID and each management frame in the second series may include the second BSSID.

In an example, the access point 110 may receive, in accordance with a first RAT, a first management frame indicating a first BSSID and a second management frame indicating a second BSSID that is different from the first BSSID (as at 410). The access point 110 may further determine RSSIs corresponding to the first management frame and the second management frame, respectively, as well as corresponding times at which each RSSI was determined.

The access point 110 may then receive at least one first additional management frame indicating the first BSSID and at least one additional second management frame indicating the second BSSID. The additional first management frame may be added to the first series and the additional second management frame may be added to the second series. The first series and the second series may be set to include all management frames received during a predetermined period of time, for example, several seconds, several minutes, etc. Additionally or alternatively, the first series and the second series may include a minimum/maximum number of management frames, for example, a minimum of two and a maximum of at least two. For each management frame in the first series and the second series, the respective RSSIs may be determined, as well as the corresponding times at which each RSSI was determined.

At 924, the access point 110 determines that a correlation between the first series of RSSI and the second series of RSSI exceeds a correlation threshold. For example, the correlation at 924 may be a correlation over a period of time. After determining at 924 that the correlation between the first series of RSSI and the second series of RSSI exceeds the correlation threshold, the access point 110 may conclude that the first management frame and the second management frame are transmitted from the same physical access point (as shown at 420 of FIG. 4), and then proceed to the assigning at 430, the setting at 440, and the transmitting at 450.

In an example, the correlation may be determined based on a correlation coefficient of the first series of RSSI and the second series of RSSI. In order to determine the correlation coefficient, the first series of RSSI and second series of RSSI may be determined during a predetermined period of time, for example, several seconds, several minutes, several scan opportunities, etc. Then, the correlation coefficient may be determined based on the first series of RSSI and the second series of RSSI in any suitable manner. For example, the correlation coefficient may be a product-moment correlation coefficient, a population correlation coefficient, or a sample correlation coefficient.

In an example, the correlation threshold may be set to 0.90 and the correlation coefficient may be a product-moment correlation coefficient. The access point 110 may determine the correlation between the first series of RSSI and the second series of RSSI by determining the product-moment correlation coefficient between the first series of RSSI and the second series of RSSI. If the correlation coefficient exceeds 0.90, then the access point 110 may determine that the first series of management frames (having the first BSSID) and the second series of management frames (having the second BSSID different from the first BSSID) were transmitted from the same physical access point.

It will be understood that in some scenarios, the correlation between the first series of RSSI and the second series of RSSI may not exceed the correlation threshold. In these scenarios, the access point 110 may determine that the first series of management frames and the second series of management frames are transmitted from different physical access points.

Figure 10:
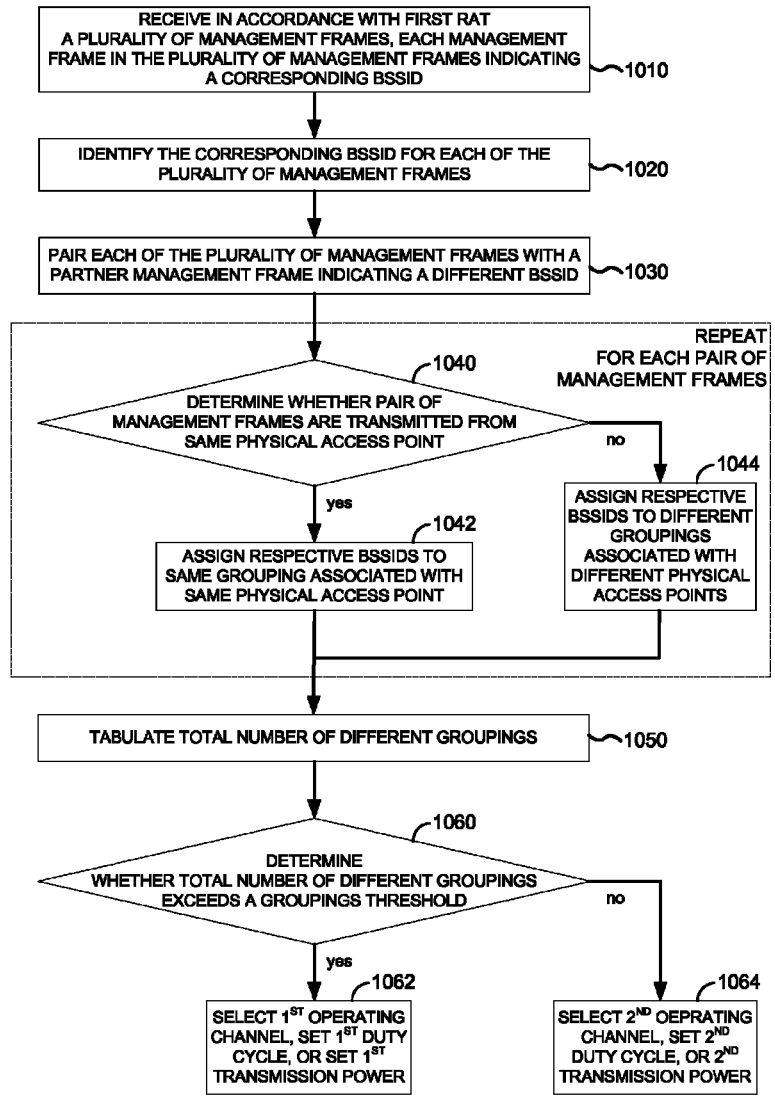
FIG. 10 illustrates another communication method in accordance with an aspect of the disclosure.

FIG. 10 illustrates an alternative communication method in accordance with an aspect of the disclosure. As will be described in further detail below, some elements of the alternative communication method depicted in FIG. 10 are analogous to elements of the communication method depicted in FIG. 4. The communication method of FIG. 10 may be performed by, for example, one or more components analogous to the first-RAT transceiver 140, the second-RAT transceiver 142, the communication controller 114, the processing system 116, and/or the memory component 118 of the access point 110. For the purposes of illustration, the communication method will be described below as it would be performed by the access point 110, however it will be appreciated that other devices and/or a combination of devices may perform the methods described herein.

At 1010, the access point 110 receives, in accordance with a first RAT, a plurality of management frames, each management frame in the plurality of management frames indicating a corresponding BSSID. The receiving at 1010 may be performed by, for example, one or more components analogous to the first-RAT transceiver 140. The receiving at 1010 may be analogous to the receiving at 410.

At 1020, the access point 110 identifies the corresponding BSSID for each of the plurality of management frames. As noted above, each management frame may include a BSSID data field that is specifically designated for BSSID data. Accordingly, the access point 110 may identify the corresponding BSSID for each of the plurality of management frames by reading the BSSID data field. The identifying at 1020 may be performed by, for example, one or more components analogous to the communication controller 114, the processing system 116, and/or the memory component 118.

At 1030, the access point 110 pairs each of the plurality of management frames with a partner management frame indicating a different BSSID. The pairing at 1030 may be performed by, for example, one or more components analogous to the communication controller 114, the processing system 116, and/or the memory component 118.

As an example, the access point 110 may determine that the management frame 211 has a BSSID of "01" and the management frame 231 has a BSSID of "02" (as depicted in FIG. 2). As a result, the access point 110 may pair the management frames 211 and 231. The access point 110 may further pair the management frame 251 (having BSSID "03") and the management frame 252 (having the BSSID "04"). The access point 110 may continue to pair management frames until all (or all but one) of the plurality of management frames is paired.

Beginning at 1040, the access point 110 analyzes each pair of management frames, for example, a first pair of management frames, a second pair of management frames, etc. To perform the analyzing, the following elements 1040, 1042, and 1044 of the communication method of FIG. 10 (encompassed by a dashed and dotted line in FIG. 10) are repeated for each pair of management frames.

At 1040, the access point 110 determines whether the pair of management frames is transmitted from the same physical access point. The determination at 1040 may be analogous to the determination at 420 depicted in FIG. 4, any of the specific implementations of the determination at 420 depicted in FIGS. 5-9, or any other implementation of the determination at 420 described in the present disclosure. For the sake of brevity, the description of the determining at 420 and 1040 will not be repeated here.

If the access point 110 determines that the pair of management frames is transmitted from the same physical access point ('yes' at 1040), then the communication method proceeds to 1042, where the access point 110 assigns the respective BSSIDs of the pair of management frames to a same grouping associated with a same physical access point.

If the access point 110 determines that the pair of management frames is not transmitted from the same physical access point ('no' at 1040), then the communication method proceeds to 1044, where the access point 110 assigns the respective BSSIDs of the pair of management frames to different groupings associated with different physical access points.

As an example, if the access point 110 determines that the management frame 211 and the management frame 231 are transmitted from different physical access points (as is the case depicted in FIG. 2), then the access point 110 will assign the respective BSSIDs of the management frames 211 and 231 ("01" and "02", respectively) to different groupings associated with different physical access points. For illustrative purposes, the different groupings may be referred to as Grouping A and Grouping B, respectively. To continue the example, the access point 110 may determine that the management frame 251 and the management frame 252 are both transmitted from the same physical access point (as is the case depicted in FIG. 2). Accordingly, the access point 110 will assign the respective BSSIDs of the management frames 251 and 252 ("03" and "04", respectively) to a same grouping associated with a same physical access point. The same grouping may be referred to as Grouping C. In this example, Grouping A includes BSSID "01", Grouping B includes BSSID "02", and Grouping C includes BSSID "03" and "04".

Once the assigning at 1042 or 1044 is completed, the communication method of FIG. 10 proceeds to 1050. Alternatively, the communication method of FIG. 10 may return to 1030 (return not shown) and reiterate the pairing of 1030, at which point the analysis at 1040, 1042, 1044 may be repeated.

When performing the first pairing at 1030, the access point 110 selects pairs of management frames on the basis of a first criteria, in particular, a first criteria that each management frame have a different BSSID than its partner management frame.

When reiterating the pairing of 1030, the access point 110 may select pairs based on additional criteria. For example, in a second criteria, each of the plurality of management frames may be paired with a partner management frame with which it has not previously been paired. Returning to an earlier example, the management frame 211 (which had previously been paired with the management frame 231) may be paired with the management frame 251 in a subsequent reiteration of the pairing of 1030.

Moreover, in a third criteria, each management frame may be paired with a partner management frame having a BSSID that is not in a same grouping. For example, if the BSSIDs "03" and "04" are assigned to a same grouping in a first iteration, and the BSSIDs "04" and "05" are assigned to the same grouping in a second iteration, then the same grouping will include BSSIDs "03", "04", and "05". Therefore, in accordance with the third criteria, the management frames 251 and 253 (which include BSSIDs "03" and "05", respectively) may not be paired in a third iteration, even though the management frames 251 and 253 include different BSSIDs (as per the first criteria) and have never previously been paired (as per the second criteria).

The communication method of FIG. 10 may return to 1030 until it is no longer possible to pair the plurality of management frames in accordance with first criteria, second criteria, third criteria, or any combination thereof. For example, the communication method of FIG. 10 may proceed to 1050 only after it determines that it is no longer possible to pair the plurality of management frames in accordance with first criteria, second criteria, third criteria, or any combination thereof.

At 1050, the access point 110 tabulates the total number of different groupings. In the example of FIG. 2, there are three physical access points depicted, including the single-BSS access point 210, the single-BSS access point 230, and the multi-BSS access point 250. Accordingly, if the access point 110 performs the receiving at 1010, the identifying at 1020, the pairing at 1030 (with any necessary reiterations thereof), the determining at 1040, and the assigning at 1042 and 1044, then the access point 110 will have assigned each unique BSSID to a particular grouping, and the total number of different groupings will be three. Although the management frames received over the communication medium 130 identify five different BSSIDs ("01", "02", "03", "04", and "05", as noted above), the access point 110 may correctly determine that the five different BSSIDs are transmitted by three different physical access points.

At 1060, the access point 110 determines whether a total number of different groupings exceeds a groupings threshold. The determining at 1060 may be based on the tabulating at 1050. For example, the groupings threshold may reflect a point at which the communication medium 130 is considered to be shared among a large number of physical access points. For example, if four is considered a relatively large number of physical access points to be sharing the communication medium 130, then the groupings threshold may be set to 3.5.

If the access point 110 determines that the total number of different groupings exceeds the groupings threshold ('yes' at 1040), then the communication method proceeds to 1062, where the access point 110 selects a first operating channel, sets a first duty cycle, or sets a first transmission power.

If the access point 110 determines that the total number of different groupings does not exceed the groupings threshold ('no' at 1040), then the communication method proceeds to 1064, where the access point 110 selects a second operating channel, sets a second duty cycle, or sets a second transmission power. The first operating channel may be different than the second operating channel. The first duty cycle may be greater than the second duty cycle, and the first transmission power may be greater than the second transmission power.

The communication method of FIG. 10 may be performed on all received management frames, or on a subset of management frames received on, for example, the first channel 131. Additionally or alternatively, the communication method of FIG. 10 may be performed on a subset of management frames received on the second channel 132. As noted above, the access point 110 may select the operating channel by determining a total number of physical access points associated with each channel of a plurality of available channels and selecting the channel associated with the smallest number of physical access points.

In an example, the communication method of FIG. 10 is performed twice. In a first iteration, the communication method of FIG. 10 is performed on the management frames associated with the first channel 131, and in a second iteration, the communication method of FIG. 10 is performed on the management frames associated with the second channel 132. During the first iteration, the total number of different groupings associated with the first channel 131 is tabulated at 1050.

Prior to completing the second iteration, the groupings threshold used in the determination of 1060 is set equal to the total number of different groupings associated with the first channel 131 (tabulated during the first iteration, as noted above).

During the second iteration, the communication medium of FIG. 10 determines (at 1060) whether the total number of different groupings associated with the second channel 132 exceeds the groupings threshold, i.e., the total number of different groupings associated with the first channel 131. Accordingly, if the total number of different groupings associated with the second channel 132 exceeds the total number of different groupings associated with the first channel 131 ('yes' at 1060), then the first channel 131 is selected as the operating channel at 1062. However, if the total number of different groupings associated with the second channel 132 does not exceed the total number of different groupings associated with the first channel 131 ('no' at 1060), then the second channel 132 is selected as the operating channel at 1064.

As noted above, the communication controller 114 of the access point 110 may be configured to determine a utilization metric associated with utilization of the communication medium 130 by the second-RAT signaling. The total number of different groupings tabulated at 1050 may constitute the utilization metric. Accordingly, if the utilization metric is high (i.e., a large number of physical access points are utilizing the communication medium 130), then the access point 110 may set the one or more parameters of the DTX communication pattern 300 such that usage of the communication medium 130 by the first-RAT transceiver 140 is reduced (e.g., by decreasing its duty cycle or transmission power). Conversely, if the utilization metric is low (i.e., a small number of physical access points are utilizing the communication medium 130), then the access point 110 may set the one or more parameters of the DTX communication pattern 300 such that usage of the communication medium 130 by the first-RAT transceiver 140 is increased (e.g., by increasing its duty cycle or transmission power).

It will be understood that the groupings threshold of 1060 may in fact comprise multiple groupings thresholds, for example, a first groupings threshold separating a small number of physical access points (low utilization) from a moderate number of physical access points (moderate utilization) and a second groupings threshold separating a moderate number of physical access points from a large number of physical access points (heavy utilization). The first groupings threshold and the second groupings threshold may be set arbitrarily. Moreover, it will be understood that the access point 110 will respond to low utilization by other physical access points by increasing its own utilization, and will respond to heavy utilization by other physical access points by decreasing its own utilization. The multiple groupings threshold may include any number of thresholds, such that any particular number of groupings may indicate a different set of one or more parameters of the DTX communication pattern 300.

Figure 11:
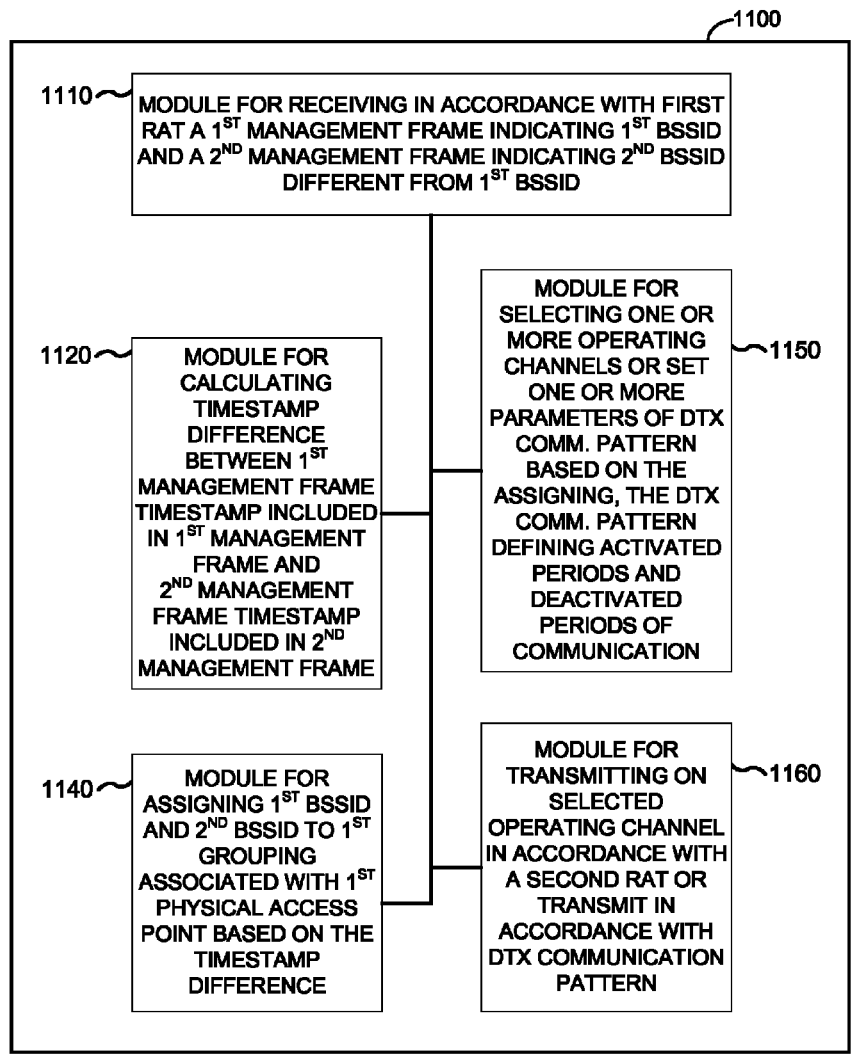
FIG. 11 illustrates an example access terminal apparatus represented as a series of interrelated functional modules.

FIG. 11 provides an alternative illustration of a communication apparatus 1100 for implementing the access terminal 120 represented as a series of interrelated functional modules.

A module 1110 for receiving in accordance with a first RAT a first management frame indicating a first BSSID and a second management frame indicating a second BSSID different from the first BSSID may correspond at least in some aspects to, for example, a communication device or a component thereof as discussed herein (e.g., the communication device 112 or the like). A module 1120 for calculating a timestamp difference between a first management frame timestamp included in the first management frame and a second management frame timestamp included in the second management frame may correspond at least in some aspects to, for example, a communication controller or a component thereof as discussed herein (e.g., the communication controller 114 or the like). A module 1140 for assigning the first BSSID and the second BSSID to a first grouping associated with a first physical access point based on the timestamp difference may correspond at least in some aspects to, for example, a communication controller or a component thereof as discussed herein (e.g., the communication controller 114 or the like). A module 1150 for selecting one or more operating channels or setting one or more parameters of a Discontinuous Transmission (DTX) communication pattern based on the assigning, the DTX communication pattern defining activated periods and deactivated periods of communication may correspond at least in some aspects to, for example, a communication controller or a component thereof as discussed herein (e.g., the communication controller 114 or the like). A module 1160 for transmitting on the one or more operating channels in accordance with a second RAT or transmitting in accordance with the DTX communication pattern may correspond at least in some aspects to, for example, a communication device or a component thereof as discussed herein (e.g., the communication device 112 or the like).

Figure 12:
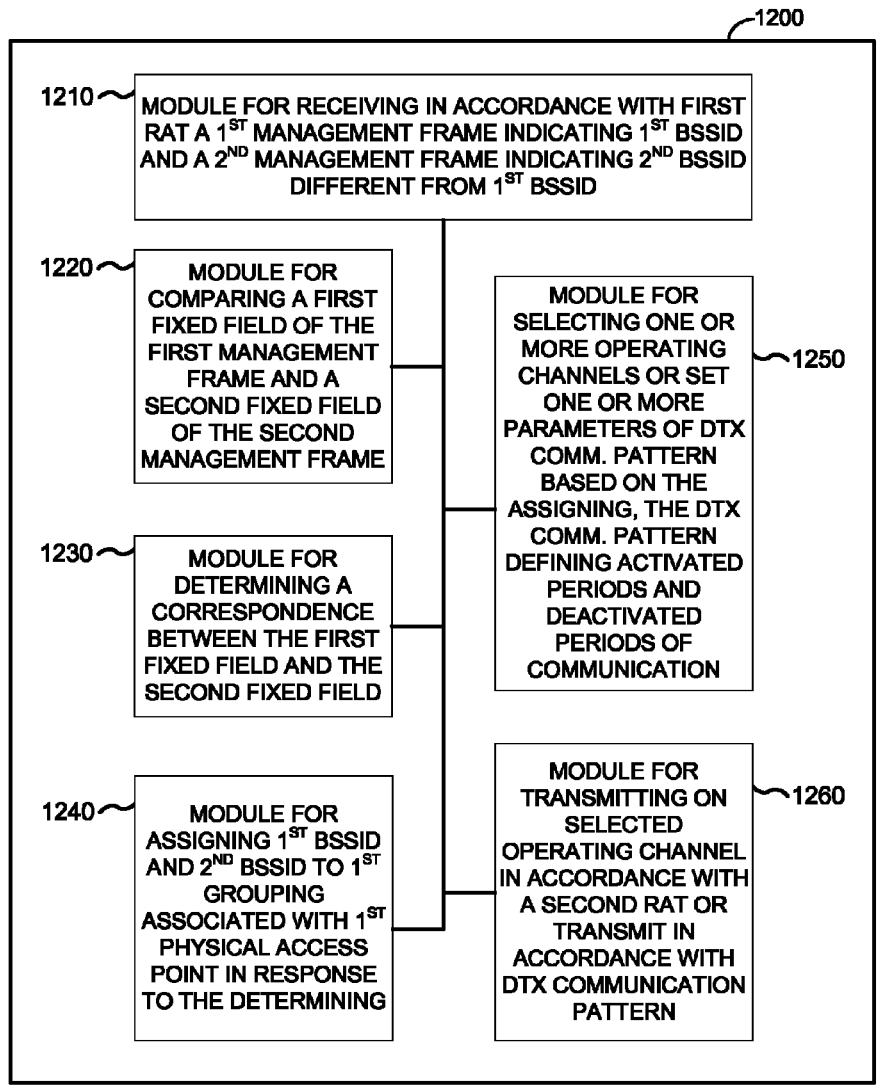
FIG. 12 illustrates another example access terminal apparatus represented as a series of interrelated functional modules.

FIG. 12 provides an alternative illustration of a communication apparatus 1200 for implementing the access terminal 120 represented as a series of interrelated functional modules.

A module 1210 for receiving in accordance with a first RAT a first management frame indicating a first BSSID and a second management frame indicating a second BSSID different from the first BSSID may correspond at least in some aspects to, for example, a communication device or a component thereof as discussed herein (e.g., the communication device 122 or the like). A module 1220 for comparing a first fixed field of the first management frame and a second fixed field of the second management frame may correspond at least in some aspects to, for example, a communication controller or a component thereof as discussed herein (e.g., the communication controller 124 or the like). A module 1230 for determining a correspondence between the first fixed field and the second fixed field may correspond at least in some aspects to, for example, a communication controller or a component thereof as discussed herein (e.g., the communication controller 124 or the like). A module 1240 for assigning the first BSSID and the second BSSID to a first grouping associated with a first physical access point in response to the determining may correspond at least in some aspects to, for example, a communication controller or a component thereof as discussed herein (e.g., the communication controller 124 or the like). A module 1250 for selecting one or more operating channels or setting one or more parameters of a Discontinuous Transmission (DTX) communication pattern based on the assigning, the DTX communication pattern defining activated periods and deactivated periods of communication may correspond at least in some aspects to, for example, a communication controller or a component thereof as discussed herein (e.g., the communication controller 124 or the like). A module 1260 for transmitting on the one or more operating channels in accordance with a second RAT or transmitting in accordance with the DTX communication pattern may correspond at least in some aspects to, for example, a communication device or a component thereof as discussed herein (e.g., the communication device 122 or the like).

Figure 13:
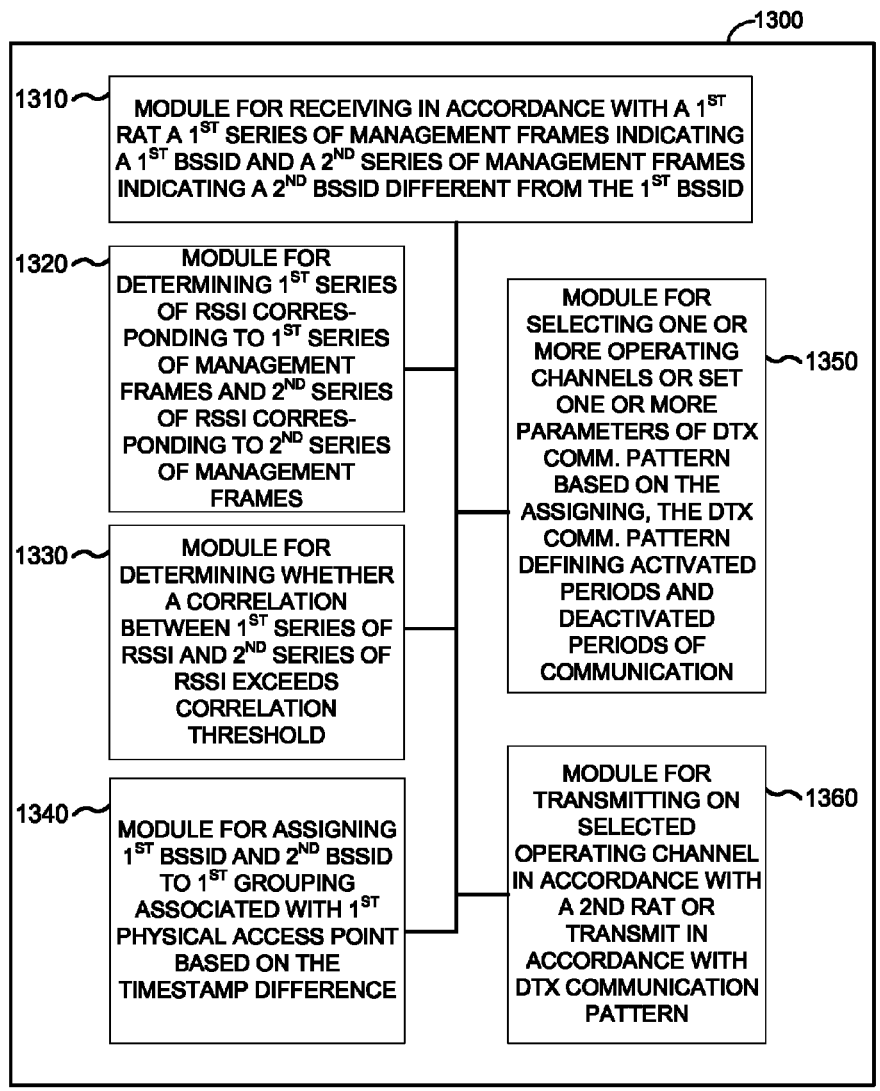
FIG. 13 illustrates yet another example access terminal apparatus represented as a series of interrelated functional modules.

FIG. 13 provides an alternative illustration of a communication apparatus 1300 for implementing the access terminal 120 represented as a series of interrelated functional modules.

A module 1310 for receiving in accordance with a first RAT a first series of management frames indicating a first BSSID and a second series of management frames indicating a second BSSID different from the first BSSID may correspond at least in some aspects to, for example, a communication device or a component thereof as discussed herein (e.g., the communication device 132 or the like). A module 1320 for determining a first series of RSSI corresponding to the first series of management frames and a second series of RSSI corresponding to the second series of management frames may correspond at least in some aspects to, for example, a communication controller or a component thereof as discussed herein (e.g., the communication controller 134 or the like). A module 1330 for determining whether a correlation between the first series of RSSI and the second series of RSSI exceeds a correlation threshold may correspond at least in some aspects to, for example, a communication controller or a component thereof as discussed herein (e.g., the communication controller 134 or the like). A module 1340 for assigning the first BSSID and the second BSSID to a first grouping associated with a first physical access point in response to the determining may correspond at least in some aspects to, for example, a communication controller or a component thereof as discussed herein (e.g., the communication controller 134 or the like). A module 1350 for selecting one or more operating channels or setting one or more parameters of a Discontinuous Transmission (DTX) communication pattern based on the assigning, the DTX communication pattern defining activated periods and deactivated periods of communication may correspond at least in some aspects to, for example, a communication controller or a component thereof as discussed herein (e.g., the communication controller 134 or the like). A module 1360 for transmitting on the one or more operating channels in accordance with a second RAT or transmitting in accordance with the DTX communication pattern may correspond at least in some aspects to, for example, a communication device or a component thereof as discussed herein (e.g., the communication device 132 or the like).

The functionality of the modules depicted in FIGS. 11-13 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 11-13, as well as other components and functions described herein, may be implemented using any suitable means. Such means also may be implemented, at least in part, using corresponding structure as taught herein. For example, the components described above in conjunction with the "module for" components of FIGS. 11-13 also may correspond to similarly designated "code for" functionality. Thus, in some aspects one or more of such means may be implemented using one or more of processor components, integrated circuits, or other suitable structure as taught herein.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   receiving in accordance with a first Radio Access Technology (RAT) a first management frame indicating a first Basic Service Set Identifier (BSSID) and a second management frame indicating a second BSSID different from the first BSSID;
   calculating a timestamp difference between a first management frame timestamp included in the first management frame and a second management frame timestamp included in the second management frame;
   assigning the first BSSID and the second BSSID to a first grouping associated with a first physical access point based on the timestamp difference;
   selecting one or more operating channels or setting one or more parameters of a Discontinuous Transmission (DTX) communication pattern based on the assigning, the DTX communication pattern defining activated periods and deactivated periods of communication; and
   transmitting on the one or more operating channels in accordance with a second RAT or transmitting in accordance with the DTX communication pattern.

2. The communication method of claim 1, the assigning the first BSSID and the second BSSID to a first grouping associated with a first physical access point based on the timestamp difference comprising:
   assigning the first BSSID and the second BSSID to a first grouping associated with a first physical access point in response to a determination that the timestamp difference is below a time threshold.

3. The communication method of claim 1, further comprising:
   measuring a receiving time lapse between a first receiving time at which the first management frame is received and a second receiving time at which the second management frame is received;
   the assigning the first BSSID and the second BSSID to a first grouping associated with a first physical access point based on the timestamp difference comprising:
      assigning the first BSSID and the second BSSID to a first grouping associated with a first physical access point in response to a determination that a difference between the receiving time lapse and the timestamp difference is below a time threshold.

4. The communication method of claim 1, each of the first management frame and the second management frame comprising either a beacon frame, a probe response frame, an association response frame, or a reassociation response frame.

5. The communication method of claim 1, the receiving comprising:
   receiving the first management frame and the second management frame from the first physical access point, the first physical access point being a multi-BSS access point.

6. The communication method of claim 1, the setting of the one or more parameters of the DTX communication pattern based on the assigning comprising:
   increasing a duty cycle or transmission power of the DTX communication pattern in response to the assigning of the first BSSID and the second BSSID to the first grouping.

7. The communication method of claim 1, the receiving of the first management frame and the second management frame comprising receiving a plurality of management frames, the plurality of management frames including the first management frame and the second management frame, each management frame in the plurality of management frames indicating a corresponding BSSID.

8. The communication method of claim 7, further comprising:
   identifying the corresponding BSSID for each of the plurality of management frames; and
   pairing each of the plurality of management frames with a partner management frame indicating a different BSSID, the first management frame and the second management frame being included in a first pair of the plurality of management frames.

9. The communication method of claim 8, further comprising analyzing each pair of management frames, each analysis comprising:
   calculating a timestamp difference between the pair of management frames;
   determining whether the timestamp difference is below a time threshold for each pair of management frames;
   in response to a determination that the timestamp difference is below the time threshold, assigning the corresponding BSSID and the different BSSID to a same grouping associated with a same physical access point; and in response to a determination that the timestamp difference is not below the time threshold, assigning the corresponding BSSID and the different BSSID to different groupings associated with different physical access points.

10. The communication method of claim 9, further comprising:
tabulating a total number of different groupings associated with different physical access points.

11. The communication method of claim 10, the setting of the one or more parameters of the DTX communication pattern comprising:
comparing the total number of different groupings to a groupings threshold;
setting a first duty cycle or a first transmission power of the DTX communication pattern based on a determination that the total number of different groupings exceeds the groupings threshold; and
setting a second duty cycle or a second transmission power of the DTX communication pattern based on a determination that the total number of different groupings does not exceed the groupings threshold.

12. The communication method of claim 11, the first duty cycle being greater than the second duty cycle, and the first transmission power being greater than the second transmission power.

13. A communication apparatus, comprising:
one or more transceivers configured to:
receive in accordance with a first Radio Access Technology (RAT) a first management frame indicating a first Basic Service Set Identifier (BSSID) and a second management frame indicating a second BSSID different from the first BSSID; and
transmit on one or more operating channels in accordance with a second RAT and transmit in accordance with a Discontinuous Transmission (DTX) communication pattern; and
at least one processor; and
at least one memory coupled to the at least one processor, the at least one processor and the at least one memory being configured to:
calculate a timestamp difference between a first management frame timestamp included in the first management frame and a second management frame timestamp included in the second management frame;
assign the first BSSID and the second BSSID to a first grouping associated with a first physical access point in response to the determining; and
select the one or more operating channels or set one or more parameters of the DTX communication pattern based on the assigning, the DTX communication pattern defining activated periods and deactivated periods of communication.

14. The communication apparatus of claim 13, the at least one processor and the at least one memory being further configured to assign the first BSSID and the second BSSID to a first grouping associated with a first physical access point in response to a determination that the timestamp difference is below a time threshold.

15. The communication apparatus of claim 13, the at least one processor and the at least one memory being further configured to:

measure a receiving time lapse between a first receiving time at which the first management frame is received and a second receiving time at which the second management frame is received; and assign the first BSSID and the second BSSID to a first grouping associated with a first physical access point in response to a determination that a difference between the receiving time lapse and the timestamp difference is below a time threshold.

16. The communication apparatus of claim 13, the at least one processor and the at least one memory being further configured to set the one or more parameters of the DTX communication pattern based on the assigning by:
increasing a duty cycle or transmission power of the DTX communication pattern in response to the assigning of the first BSSID and the second BSSID to the first grouping.

17. The communication apparatus of claim 13, the at least one processor and the at least one memory being further configured to receive a plurality of management frames, the plurality of management frames including the first management frame and the second management frame, each management frame in the plurality of management frames indicating a corresponding BSSID.

18. The communication apparatus of claim 17, the at least one processor and the at least one memory being further configured to:
identify the corresponding BSSID for each of the plurality of management frames; and
pair each of the plurality of management frames with a partner management frame indicating a different BSSID, the first management frame and the second management frame being included in a first pair of the plurality of management frames.

19. The communication apparatus of claim 18, the at least one processor and the at least one memory being further configured to analyze each pair of management frames, each analysis comprising:
calculating a timestamp difference between the pair of management frames;
determining whether the timestamp difference is below a time threshold for each pair of management frames;
in response to a determination that the timestamp difference is below the time threshold, assigning the corresponding BSSID and the different BSSID to a same grouping associated with a same physical access point; and
in response to a determination that the timestamp difference is not below the time threshold, assigning the corresponding BSSID and the different BSSID to different groupings associated with different physical access points.

20. The communication apparatus of claim 19, the at least one processor and the at least one memory being further configured to:
tabulate a total number of different groupings associated with different physical access points.

21. The communication apparatus of claim 20, the at least one processor and the at least one memory being further configured to set the one or more parameters of the DTX communication pattern based on the assigning by:
comparing the total number of different groupings to a groupings threshold;
setting a first duty cycle or a first transmission power of the DTX communication pattern based on a determination that the total number of different groupings exceeds the groupings threshold; and setting a second duty cycle or a second transmission power of the DTX communication pattern based on a determination that the total number of different groupings does not exceed the groupings threshold.

22. A communication method, comprising:
receiving in accordance with a first Radio Access Technology (RAT) a first management frame indicating a first Basic Service Set Identifier (BSSID) and a second management frame indicating a second BSSID different from the first BSSID;
comparing a first fixed field of the first management frame and a second fixed field of the second management frame;
determining a correspondence between the first fixed field and the second fixed field;
assigning the first BSSID and the second BSSID to a first grouping associated with a first physical access point in response to the determining;
selecting one or more operating channels or setting one or more parameters of a Discontinuous Transmission (DTX) communication pattern based on the assigning, the DTX communication pattern defining activated periods and deactivated periods of communication; and
transmitting on the one or more operating channels in accordance with a second RAT or transmitting in accordance with the DTX communication pattern.

23. The communication method of claim 22, the first fixed field including data indicating a first management frame size of the first management frame, and the second fixed field including data indicating a second management frame size of the second management frame.

24. The communication method of claim 23, the determining of the correspondence comprising determining that the first management frame size is equal to the second management frame size.

25. The communication method of claim 22, the first fixed field including data indicating a first management frame sequence number of the first management frame, and the second fixed field including data indicating a second management frame sequence number of the second management frame.

26. The communication method of claim 25, the determining of the correspondence comprising determining that the first management frame sequence number is subsequent to the second management frame sequence number.

27. A communication method, comprising:
receiving in accordance with a first Radio Access Technology (RAT) a first series of management frames indicating a first Basic Service Set Identifier (BSSID) and a second series of management frames indicating a second BSSID different from the first BSSID;
determining a first series of received signal strength indications (RSSI) corresponding to the first series of management frames and a second series of RSSI corresponding to the second series of management frames;
determining a correlation between the first series of RSSI and the second series of RSSI exceeds a correlation threshold;
assigning the first BSSID and the second BSSID to a first grouping associated with a first physical access point in response to the determining;
selecting one or more operating channels or setting one or more parameters of a Discontinuous Transmission (DTX) communication pattern based on the assigning, the DTX communication pattern defining activated periods and deactivated periods of communication; and
transmitting on the one or more operating channels in accordance with a second RAT or transmitting in accordance with the DTX communication pattern.

28. The communication method of claim 27, the determining a correlation comprising determining the correlation between the first series of RSSI and the second series of RSSI over a period of time.

29. The communication method of claim 27, the receiving comprising:
receiving the first series of management frames and the second series of management frames from the first physical access point, the first physical access point being a multi-BSS access point.

30. The communication method of claim 27, the setting of the one or more parameters of the DTX communication pattern based on the assigning comprising:
increasing a duty cycle or transmission power of the DTX communication pattern in response to the assigning of the first BSSID and the second BSSID to the first grouping.

* * * * *